United States Patent
Hsu (10) Patent No.: US 8,330,319 B2
(45) Date of Patent: Dec. 11, 2012

(54) SUBSTANTIALLY PARALLEL FLUX UNCLUTTERED ROTOR MACHINES

(75) Inventor: John S. Hsu, Oak Ridge, TN (US)

(73) Assignee: UT Batelle, LLC, Oakridge, TN (US)

( * ) Notice: Subject to any disclaimer, the term of this patent is extended or adjusted under 35 U.S.C. 154(b) by 287 days.

(21) Appl. No.: 12/466,169

(22) Filed: May 14, 2009

(65) Prior Publication Data
US 2010/0123364 A1 May 20, 2010

Related U.S. Application Data

(60) Provisional application No. 61/199,841, filed on Nov. 20, 2008.

(51) Int. Cl.
*H02K 1/06* (2006.01)
*H02K 19/12* (2006.01)
*H02K 19/26* (2006.01)

(52) U.S. Cl. .......... 310/216.129; 310/164; 310/216.114; 310/261.1

(58) Field of Classification Search ................. 310/163, 310/178, 190, 191, 263, 164–166, 168, 162, 310/216.004, 216.057, 216.058, 216.113, 310/216.114, 216.125, 216.129, 261.1, 266
See application file for complete search history.

(56) References Cited

U.S. PATENT DOCUMENTS

| 588,602 | A | * | 8/1897 | Rice ............................. 310/168 |
|---|---|---|---|---|
| 2,796,542 | A | | 6/1957 | Bekey et al. |
| 2,987,637 | A | | 6/1961 | Bertsche et al. |
| 3,017,562 | A | | 6/1962 | Duane |
| 3,132,272 | A | | 5/1964 | MacFarlane |
| 3,303,369 | A | | 2/1967 | Erickson |
| 3,321,652 | A | * | 5/1967 | Opel ............................. 310/168 |
| 3,484,635 | A | | 12/1969 | MacKallor |
| 3,663,846 | A | * | 5/1972 | Wagner et al. ................. 310/164 |
| 4,110,642 | A | | 8/1978 | Thiele |

(Continued)

FOREIGN PATENT DOCUMENTS

JP 63195382 8/1988

(Continued)

OTHER PUBLICATIONS

Fitzgerald, A. E. et al., Chapter 7, "Engineering Considerations," Fig. 7-16, Electric Machinery: The Dynamics and Statics of Electromechanical Energy Conversion, 2nd Ed., McGraw-Hill Book Company, New York, NY, Copyright 1961, pp. 362.

(Continued)

*Primary Examiner* — Tran Nguyen
*Assistant Examiner* — Eric Johnson
(74) *Attorney, Agent, or Firm* — Brinks Hofer Gilson & Lione (57) ABSTRACT

A permanent magnet-less and brushless synchronous system includes a stator that generates a magnetic rotating field when sourced by polyphase alternating currents. An uncluttered rotor is positioned within the magnetic rotating field and is spaced apart from the stator. An excitation core is spaced apart from the stator and the uncluttered rotor and magnetically couples the uncluttered rotor. The brushless excitation source generates a magnet torque by inducing magnetic poles near an outer peripheral surface of the uncluttered rotor, and the stator currents also generate a reluctance torque by a reaction of the difference between the direct and quadrature magnetic paths of the uncluttered rotor. The system can be used either as a motor or a generator

20 Claims, 6 Drawing Sheets

U.S. PATENT DOCUMENTS

| | | | | |
|---|---|---|---|---|
| 4,250,424 | A * | 2/1981 | Sento et al. | 310/216.133 |
| 4,898,038 | A | 2/1990 | Kitamura | |
| 4,980,595 | A | 12/1990 | Arora | |
| 5,929,541 | A * | 7/1999 | Naito et al. | 310/12.18 |
| 6,608,424 | B2 * | 8/2003 | Kusase | 310/263 |
| 6,680,557 | B2 * | 1/2004 | Kusase | 310/263 |
| 6,891,301 | B1 | 5/2005 | Hsu | |
| 6,977,454 | B2 | 12/2005 | Hsu | |
| 7,134,180 | B2 | 11/2006 | Hsu | |
| 7,135,802 | B2 | 11/2006 | Seki et al. | |
| 7,270,203 | B2 | 9/2007 | Hsu | |
| 7,834,512 | B2 * | 11/2010 | Isogai | 310/263 |
| 8,110,961 | B2 | 2/2012 | Hsu | |
| 2006/0197346 | A1 * | 9/2006 | Maehara | 290/40 B |
| 2009/0146511 | A1 | 6/2009 | Hsu | |
| 2009/0218895 | A1 | 9/2009 | Hsu | |

FOREIGN PATENT DOCUMENTS

| | | |
|---|---|---|
| JP | 2001-157425 | 6/2001 |

OTHER PUBLICATIONS

Parsa, L. et al., "Five-Phase Interior Permanent Magnet Motor with Low Torque Pulsation," *IEEE,* 2005, pp. 1770-1775.

* cited by examiner

SUBSTANTIALLY PARALLEL FLUX UNCLUTTERED ROTOR MACHINES

PRIORITY CLAIM

This application claims the benefit of priority from U.S. Provisional Application No. 61/199,841, filed Nov. 20, 2008, U.S. application Ser. No. 12/274,895, filed Nov. 20, 2008, and U.S. application Ser. No. 12/466,212, filed May 14, 2009, all of which are incorporated herein by reference.

GOVERNMENT INTEREST

This application was made with United States government support under Contract No. DE-AC05-00OR22725 awarded by the United States Department of Energy. The United States Government has certain rights in these inventions.

BACKGROUND OF THE INVENTION

1. Technical Field

This disclosure relates to electric machines, and more specifically to synchronous systems that generate reluctance and magnet torques.

2. Related Art

Permanent magnet machines may supply small or large amounts of power. These rotating machines convert mechanical energy into electrical energy through a rotation. Some rotating machines may convert electrical energy into mechanical energy. A rotor, which carries fixed permanent magnets, rotates in a magnetic field that induces an electromotive force in the windings of the stator core.

In vehicles, interior permanent magnets may be mounted near the outer circumference of the rotor that produces a rotating field. The rotor punching bridges that extend between the cavities that house the permanent magnets may counter the centrifugal force that may be directed away from a center or axis. As the revolution about the axis increase, centrifugal force increases and the need for stronger bridges increase. With stronger bridges, leakages flux passing though these bridges increase, which decreases motor performance.

In some applications, permanent magnet machines may not provide a good power factor at slow speeds. In other applications, the operating temperature of a permanent magnet machine may be limited. At some temperatures, permanent magnets may be become demagnetized.

In other applications the back electromotive force in the stator winding induced by the permanent magnets may limit motor speed. Performance limitations may come at a high cost, as the cost of the rare-earth permanent magnets can be substantially higher than those of iron and copper.

SUMMARY

A permanent magnet-less synchronous system includes a stator that generates a magnetic rotating field when sourced by an alternating current. An uncluttered rotor is positioned within the magnetic rotating field and spaced apart from the stator. An excitation coil is spaced apart from the stator and the uncluttered rotor and is magnetically coupled to the uncluttered rotor. The excitation source generates a magnet torque by inducing magnetic poles near an outer peripheral surface of the uncluttered rotor, which interact with the stator currents. This interaction generates a magnet torque. The stator currents also interact with the unequal magnetic paths along a direct axis and a quadrature axis of the rotor to produce a reluctance torque.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A synchronous system generates high power density through a reluctance torque and magnet torque at a high torque to weight ratio. Without permanent magnets, some of these brushless, slip-ring-less, and commutator-less constructions have reduced sizes, lower weights (e.g., due to their frameless or bracket-less constructions) and less core losses. In vehicles that may use radial or axial gap motors, there may be little to no core losses when the system runs free without field excitations. The high power density and driving torque of these systems may be used in other applications that have short, intermediate, or long core lengths. Dynamic balances are improved when systems do not include rotating rotor windings that may tend to shift at high temperature and speed. In these systems and others, the excitation fields may be cut off to enhance safety, fields may be boosted to increase or reach peak acceleration power in short time periods, power factors may be optimized, and efficiency may increase due to the adjustable excitation and stator fields. Fuel efficiency may increase not only from the motor but also from the devices that supply the electric power to the motor due to improved power factors of the motor and the adjustable field control to optimize the back electromotive force in the stator winding that may be connected to power supply devices. The synchronous systems may be mass produced and may have higher power densities and lower power costs per kilowatt than some induction systems. Some synchronous systems are highly efficient in comparison to some permanent magnet motor constructions. The systems may be operated as an alternating current machine, a motor, or a generator, for example.

Figure 6:
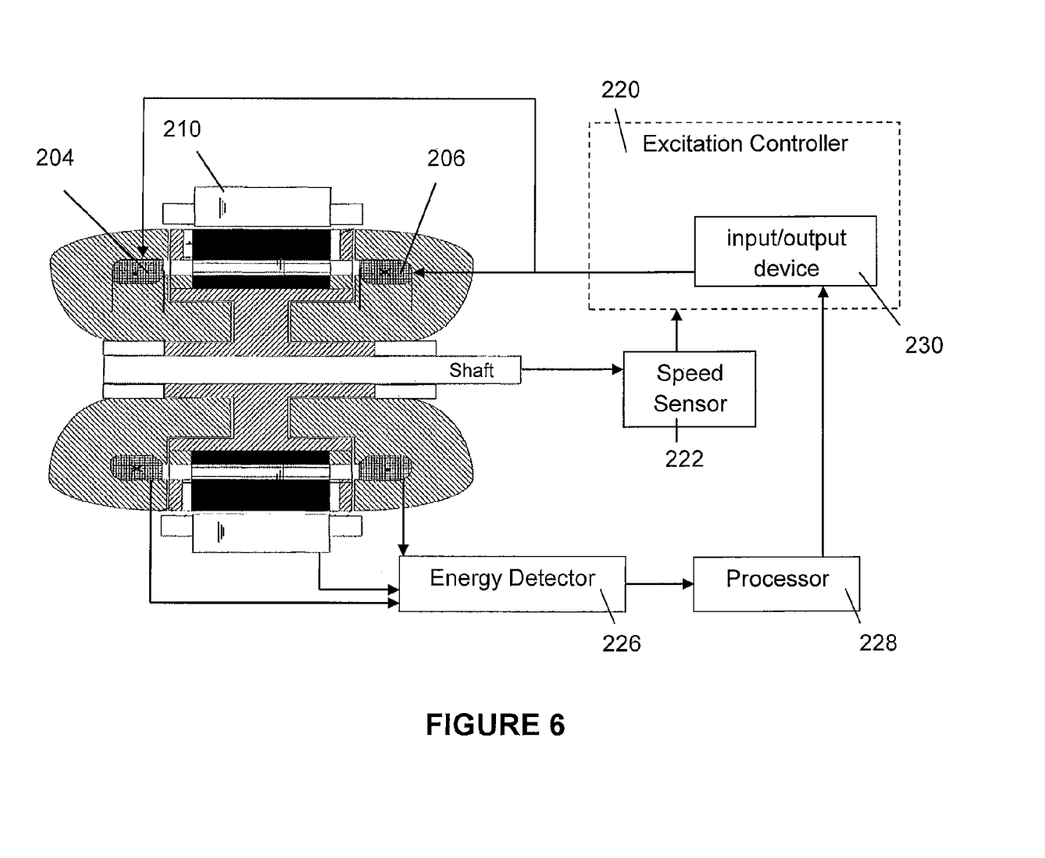
FIG. 6 is an exemplary synchronous system.

Some synchronous systems, as shown in FIG. 6, include an uncluttered rotor that rotates within an outer substantially cylindrical stator between two or more stationary elements that comprise the excitation source. The stationary elements may comprise substantially similar ring-like conducting elements formed by rotating a closed loop (e.g., like an ellipse, circle, or irregular curve) about an axis of rotation. In some synchronous systems, the elements provide mechanical support for the uncluttered rotor while providing a portion of the flux carrying path that renders a portion of the system's magnet torque. Because the excitation fields are adjustable (through an excitation controller 220 in FIG. 6), some systems counter the electromotive force (EMF) that is proportional to the system's speed or engine speed if coupled to a vehicle (e.g., EMF may increase with speed) by controlling excitation field strength that may further improve the system's power factor control. EMF control may occur in response to an output of a speed sensor 222 in FIG. 6 (e.g. the sensor may monitor rotor rotation, shaft rotation, speed of the primer mover, etc.) that communicates with the excitation controller directly or indirectly through other controllers, sensors, conditioning devices, etc.

When failure occurs, such as when a stator short is detected by an energy detector 226 in FIG. 6 (e.g., that may comprise a current or voltage sensor, for example, that monitors system elements and identifies excessive current and/or voltage conditions), the computer hardware (e.g., a processor 228 in FIG. 6) in communication with an input/output controller 230 in FIG. 6 (or processor) or front-end processor of the excitation controller 220 may shutoff or lower the output of the excitation source. Unlike some permanent magnet machines, without an excitation field, some synchronous systems do not function as a generator or resist the rotation driven by the primer mover under a system failure. Through the brushless excitation and the inducement of nonpermanent magnet poles on the uncluttered rotor, the permanent magnet-less, brushless, slip-ring-less systems generate a reluctance torque and a magnetic torque.

Figure 1:
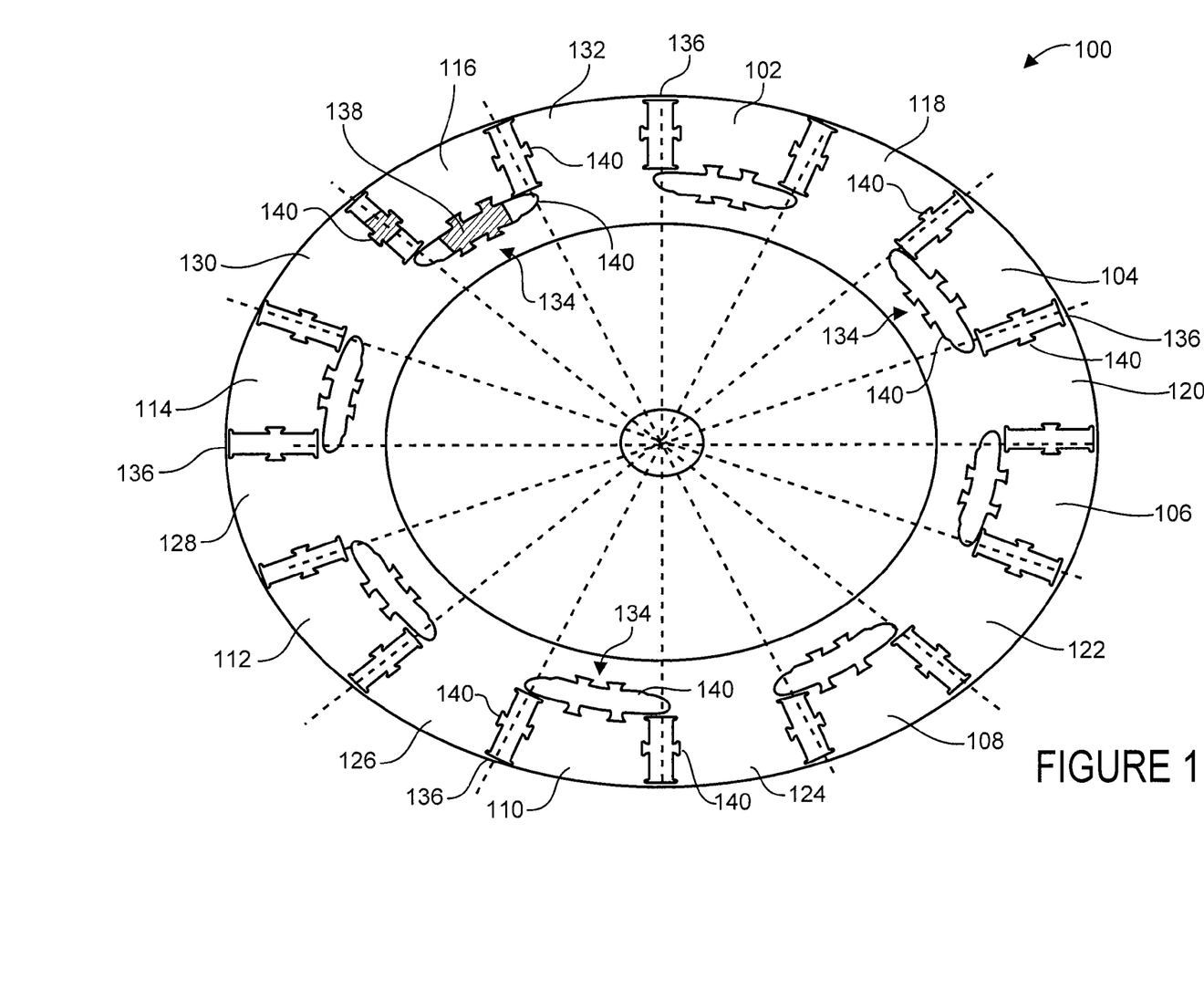
FIG. 1 is a side view of an exemplary uncluttered rotor.
Figure 2:
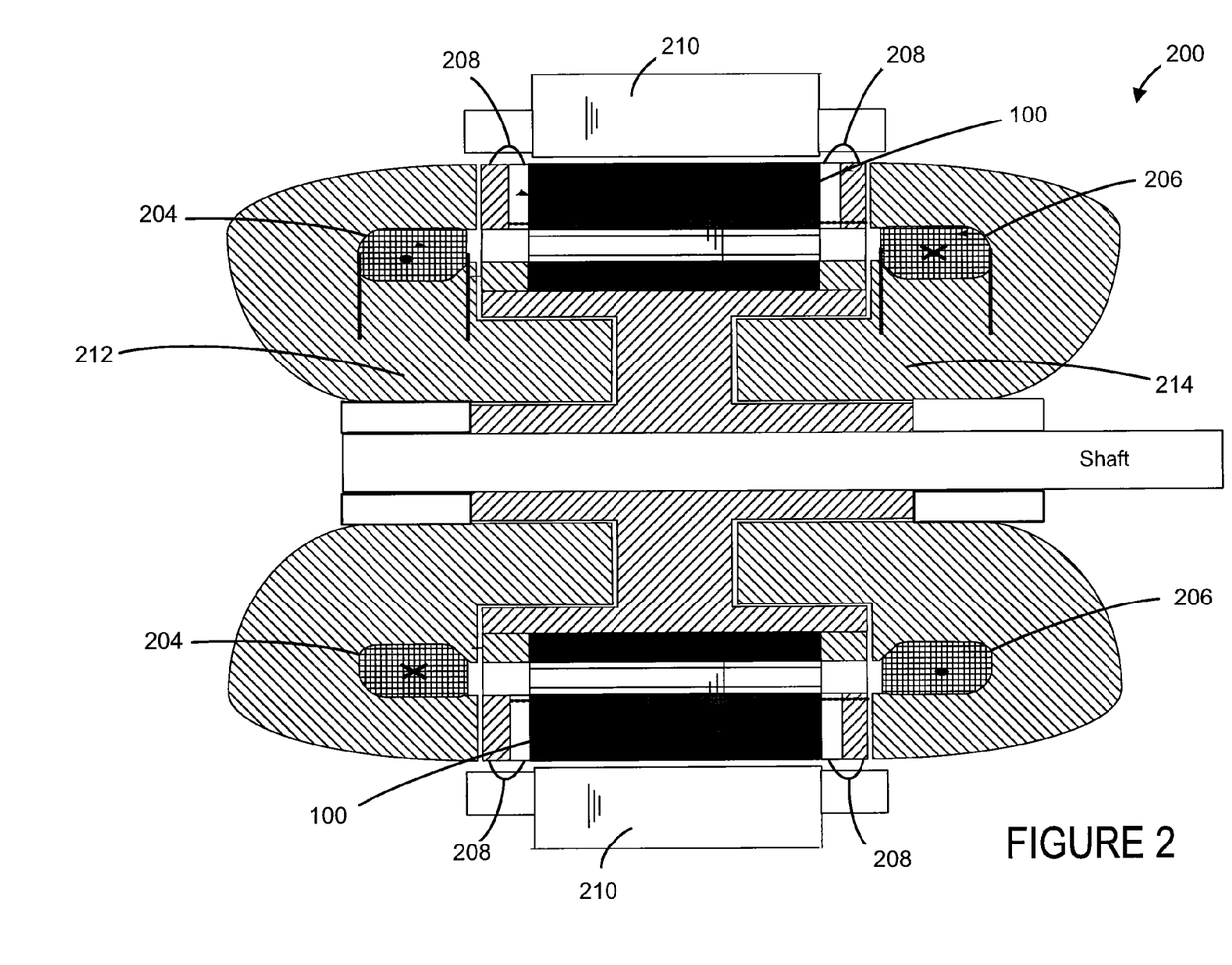
FIG. 2 is a top cross-sectional view of an exemplary motor.

FIG. 1 is a side view of an exemplary uncluttered rotor 100 and FIG. 2 is a top cross-sectional view of an exemplary motor 200. In cross-section, the excitation cores 212 and 214 of FIG. 2 may include toroidal-like excitation coils (e.g., the toroidal-like excitation cores 214 and 212 may couple two separate conductors or coils as shown in cross-section to the left and right of the uncluttered rotor 100). The excitation cores 212 and 214 provide mechanical support for the uncluttered rotor 100 and render a portion of the flux carrying path through a non-salient coupling. The dual function of the excitation cores 212 and 214 may act as the end bracket for housing the bearing as well as the excitation flux carrier may source one or more direct current (dc) excitation fields that render a magnet torque. The excitation flux path flows through the uncluttered rotor's pole portions (or pieces) 102-132. The magnetic pole pieces 102-116 of the same polar sign may be partially enclosed by a body 134 (e.g., U-like shape or parabolic-like) formed by grooves 140 (or cut-out portions) about the outer periphery of the uncluttered rotor 100. Symmetry may be maintained by positioning the magnetic poles of opposite polarity 118-132 having the same polar sign outside of the partially enclosed body 134 or U-like shape (e.g., adjacent poles are of opposite polarity). In FIG. 1, the uncluttered rotor 100 comprises sixteen poles 102-132. Eight pole pieces 102-116 of one polarity are enclosed by the U-like shapes (selected U-like shape portions are identified as 134) and eight pole pieces 118-132 of a second opposite polarity are positioned outside of the body 134 or U-like shapes. Although sixteen pole portions are illustrated in this example, more or less pole portions are used in alternate systems. In these and each of the other synchronous systems described or to be described, the excitation coils 204 and 206 may comprise two or more conductors or coils that may have a ring like shape (e.g., like an ellipse, circle, irregular curve, toroidal-like shape, etc.)

The uncluttered rotor 100 and pole portions 102-132 may be formed from laminations bounded by two concentric circles. A solid forged core may support the laminations through an upper surface. Alternatively, the uncluttered rotor 100 may comprise lamination stacks that may be made of silicon steel. Each annulus-like shaped lamination may include multiple narrow bridges 136 of a width configured to maintain the integrity of the lamination during assembly or handling. In some systems, the dimensions of the narrow bridges 136 are not sized to counter the effect of centrifugal force. Mechanical reinforcement elements 138 may counter the centrifugal force with/without narrow bridges 136 while maintaining rotor integrity at high rotational speeds. In some applications, the width of the narrow bridges 136 may be about one millimeter or less. In some applications, the uncluttered rotor 100 may be subject to rotations greater than about ten thousand rotations-per-minute such as about fourteen thousand or more rotations-per-minute that some synchronous systems are subject to. As the rotational rates increase, these exemplary synchronous systems are not constrained by the performance limitations of thicker and/or stronger bridges that enable greater flux leakages that may impede system performance.

Figure 3:
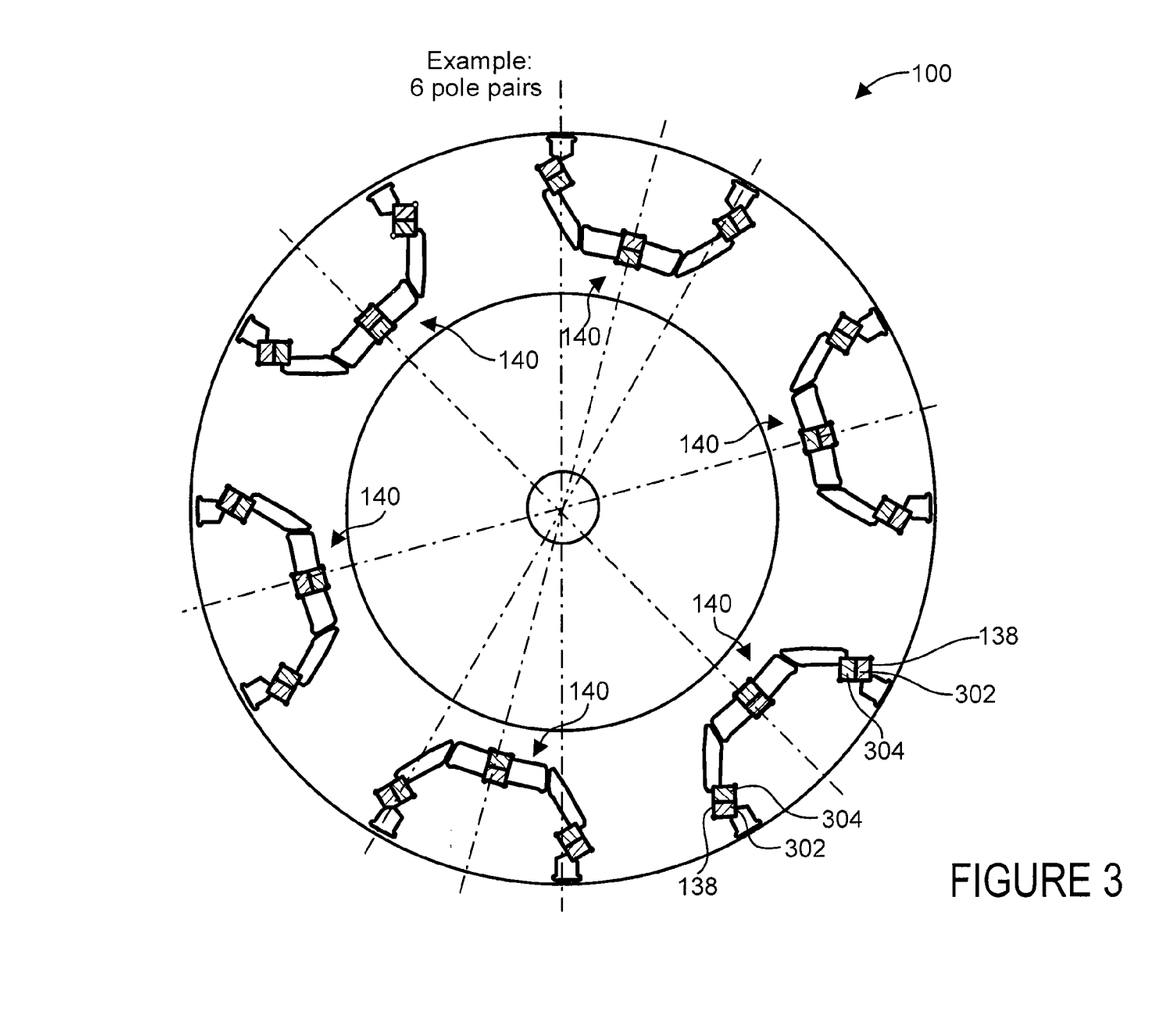
FIG. 3 is a side view of an alternative exemplary uncluttered rotor.

In FIG. 1, the mechanical reinforcement elements 138 may be received by one or more of the cross-like shaped grooves 140 or cutout portions (selected grooves are designated 140) that bound the perimeter of the body 134 or U-like shape. The mechanical reinforcement elements 138 may be made of a non-magnetic and high mechanical strength material that passes through the one, two, or more groves 140 (or all) of each of the laminations that may receive the mechanical reinforcement elements 138 like a keyway to render a unitary or integrated uncluttered rotor 100. The mechanical reinforcement elements 138 may pass between a proximal and distal end of a groove 140, and may be seated or secured by dove tail-like, notch-like, reciprocal notches, or other securing engagements of other dimensions and shapes that may be formed in all (e.g., when aligned may form a notch) or some of the laminations (e.g., a securing engagement may be formed only on the outer upper and lower surfaces of the lamination stack). Like the shape and number of grooves shown in FIGS. 1 and 3, the mechanical reinforcement elements 138 may vary in shape, size, engagement, number, etc. In FIG. 1, unitary rectangular mechanical reinforcement elements 138 of different lengths (e.g., two lengths are shown) are seated in reciprocal notches and pass through axial and radial grooves 140. The mechanical reinforcement elements may be inserted from a common surface or may be inserted through opposite left side (shown) and right side surfaces (not shown). In FIG. 3, the arch-like structures formed by the many discontinuous grooves 140 (or cutout portions) are secured by mechanical reinforcement elements 138 comprising two (302 and 304) or more securing elements (e.g., joining elements) having tapered edges like a wedge. The wedge-like shaped elements pass through the entire lamination stack and may be in contact with a portion of each groove 140 or some of the grooves 140. The wedge-like elements 302 and 304 may be biased by a preload force when inserted from a common or opposite radial surfaces of the uncluttered rotor 100. In other synchronous systems, the wedge-like elements, unitary rectangular elements, and other mechanical reinforcement elements may couple some or all of the laminations in combinations and may be joined to some or all of the laminations through swaging. The tensile strength, shear strength, and other mechanical properties of the mechanical reinforcement elements 138 may vary with the size of the uncluttered rotor 100, the speed of rotation of the uncluttered rotor 100, and in some systems, other mechanical properties or applications of the systems.

Figure 4:
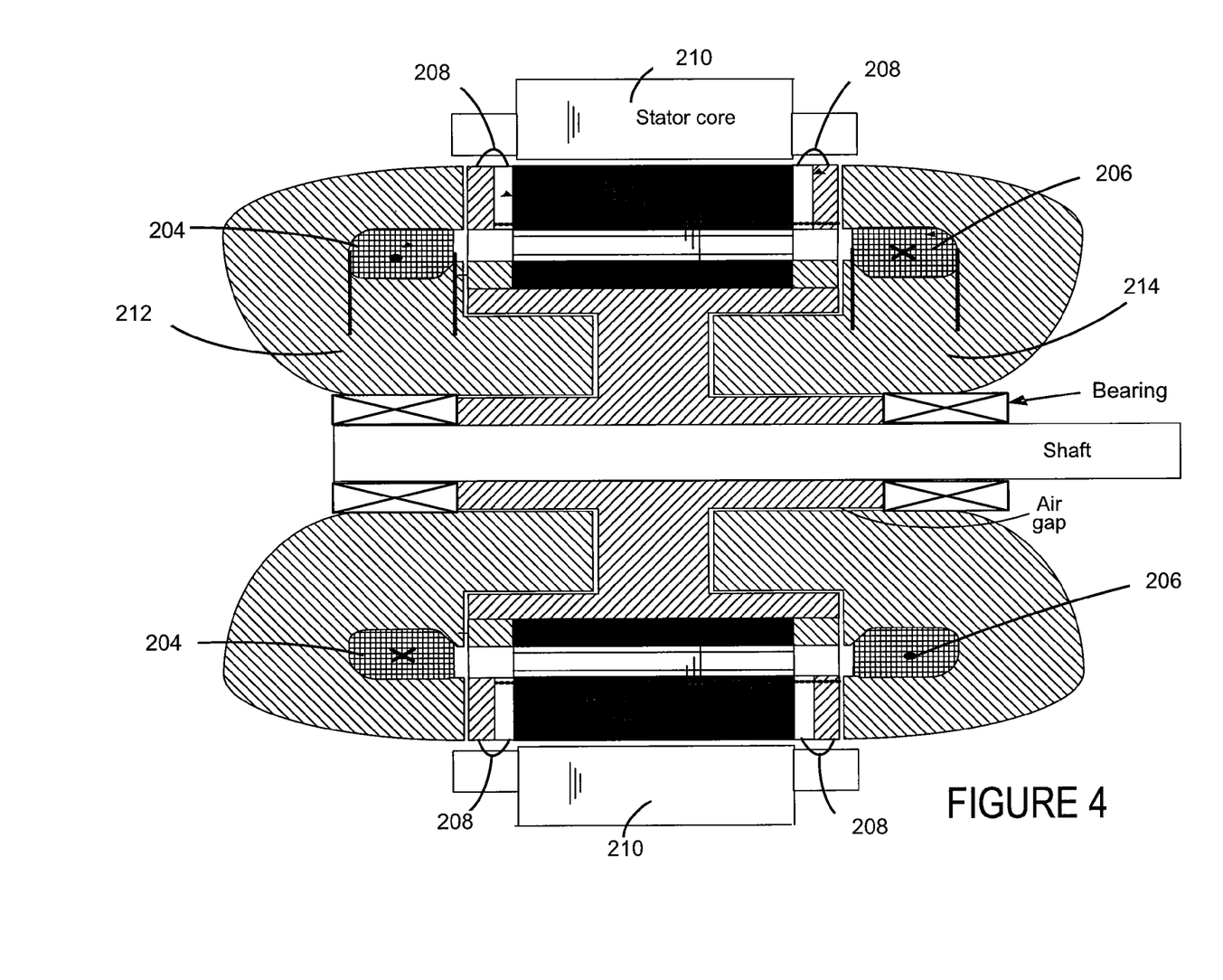
FIG. 4 is a top cross-sectional view of an alternative exemplary motor.
Figure 5:
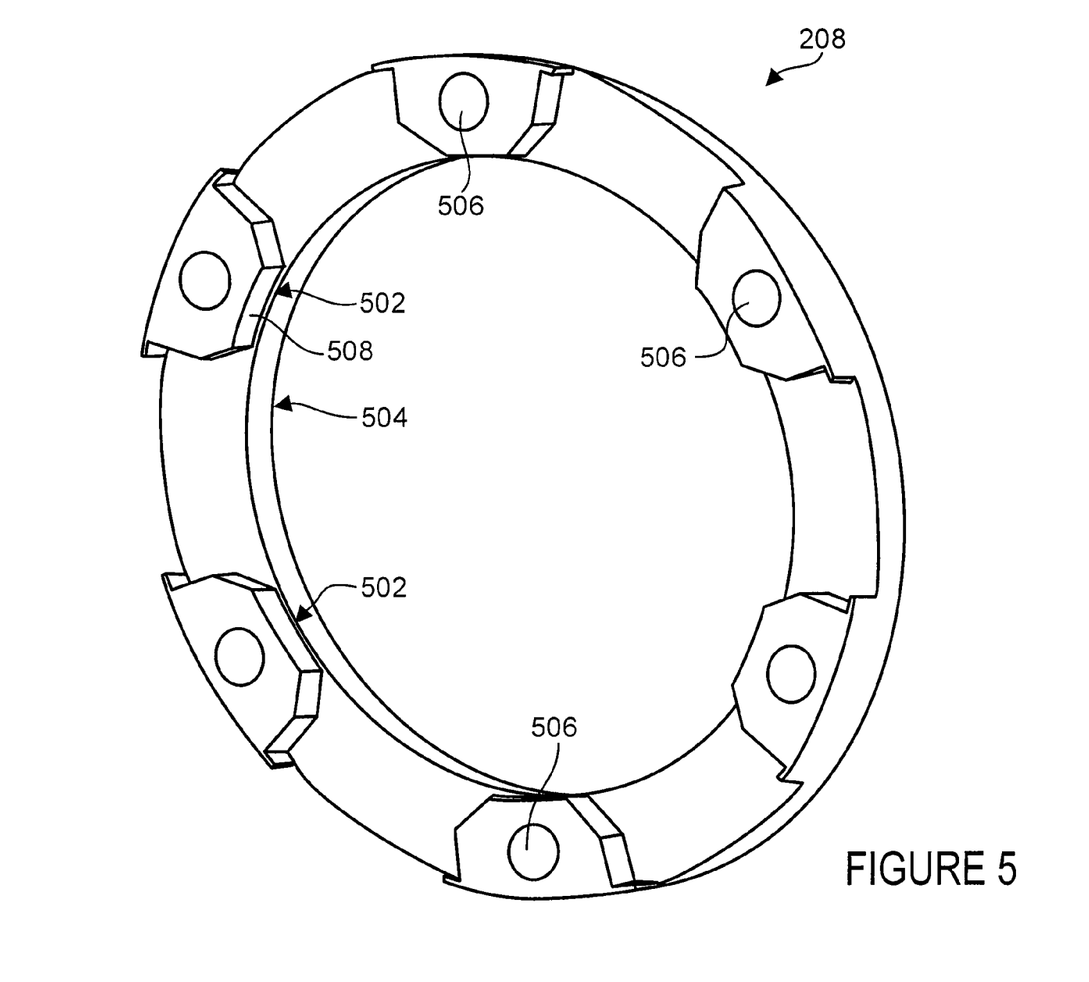
FIG. 5 is a side isometric view of an exemplary end piece.

To assemble the synchronous system, a longitudinal slot milled along the rotor hub (that may receive a shaft that couples a prime mover) or keyway may join the rotor hub (not shown) to the uncluttered rotor 100. One, two, or more bearings may further support and reduce the friction between the fixed part and rotating uncluttered rotor 100 shown in FIG. 4. Alternative synchronous systems may provide support without bearings (e.g., bearing-less). An end-piece 208 shown in FIGS. 2, 4, and 5 (FIGS. 2 and 4 show an end-piece for a 16 pole machine and FIG. 5 shows an end-piece for a 12 pole machine) may couple the outer annular perimeter of the uncluttered rotor 100. The end-piece 208 comprises raised (or protruded) portions 502 joined, milled, machined, etc., to a substantially uniform lower annulus portion 504. The substantially symmetrical plane that comprises the raised portions 502 of the exemplary end-piece 208 shown in FIG. 5 is bounded by four linear sides, and inner and outer curved curvilinear surfaces that enclose six vertices from a one dimensional view. Shallow concavities 506 may be formed in each of the raised portions 502. Some alternative systems do not include some or all of the concavities 506 shown in FIG. 5.

When coupled to the uncluttered rotor 100, the inner curved linear surfaces 508 of the raised portions 502 may be substantially aligned with the open area of the body 134 or open area of the U-like shape formed by grooves 140 (or cut-out portions). While the end-piece 208 may look similar to the lamination stack that may comprise the uncluttered rotor 100, dimensionally, the end-piece has a greater thickness (e.g., width) near the open area of the body 134 or U-like shape than outside of the open area of the body 134 or U-like shape.

Functionally, the end-piece 208 ensures that the flux generated by current flow through the toroidal-like excitation coils 204 and 206 (e.g., flowing from the '●' to the 'x' to ensure a common polarity from the left-hand axial side and the right-hand axial side) is delivered to the pole pieces 102-116 of the same polarity. In FIGS. 2 and 4, the hatched area or raised portions 502 of the end-piece 208 (that comprises the hatched and un-hatched areas) ensures that flux does not flow to the undesired or unwanted polarity. Instead, the toroidal-like excitation coils 204 and 206 push the flux to substantially the center of the uncluttered rotor 100 through the raised portions 502, which may ensure that the flux is distributed substantially uniformly along substantially the entire annulus of the uncluttered rotor 100. Through this exemplary configuration, flux leakages and losses are reduced.

The end-piece 208 of FIG. 5 may be machined, forged, sintered, or die cast for example. Like the exemplary shapes that illustrate the grooves 140 (or cutout portions) of the uncluttered rotor 100, the shapes and the dimensions of the raised portions 502 may vary in shape and dimension in alternate systems and applications. Moreover, many types of stators may be used to generate rotating fields. Exemplary stators may include wound stators such as a double-layer, single-layer, mush-wound, form-wound, distributed-winding, concentrated-pole, integral-slot, and fractional-slot wound stator. The stator 210 of FIG. 2 may be built from punchings or laminations, for example. The laminations may be keyed or bolted to a position adjacent the uncluttered rotor 100. An axial air gap that may be substantially perpendicular to a radial air gap portion of an inner air gap that separates a portion of the toroidal-like excitation cores 212 and 214 and the end-piece 208. While the stator 210 is shown in an open-air configuration in FIGS. 2 and 4, in alternative systems an enclosure surrounds the excitation cores 214 and 212, excitation coils 204 and 206, uncluttered rotor 100, and stator core 210 to protect the synchronous system from contaminates. A forced ventilation or cooling system may carry away the heat, while in other systems natural ventilation circulate air cooling currents and reduce windage noise. These configurations benefit noise sensitive applications and systems such as vehicle applications.

Other alternate systems and methods may include combinations of some or all of the structure and functions described above, incorporated by reference, or shown in one or more or each of the figures. As used in the description and throughout the claims a singular reference of an element includes and encompasses plural references unless the context clearly dictates otherwise. Also, as used in the description and throughout the claims that follow, the meaning of "in" includes "in" and "on" unless the context clearly dictates otherwise. These systems or methods may be formed from any combination of structure and function described or illustrated. Some alternative systems or devices interface structures that transport person or things such as vehicles. The system may convert one form of energy into another (e.g., convert electric current into mechanical power as a motor or alternatively, as a generator). When used as a generator, for example, mechanical energy may drive or couple the shaft causing the generator to output electrical energy through the stator windings.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A permanent magnet-less, brushless synchronous system comprising:
   a stator that generates a magnetic rotating field when sourced by an alternating current;
   an uncluttered rotor disposed within the magnetic rotating field and spaced apart from the stator to form an air gap relative to an axis of rotation, the uncluttered rotor comprising a plurality of U-like shaped sections distributed about an outer periphery of the uncluttered rotor wherein each and every one of the plurality of U-like shaped sections on the uncluttered rotor partially encloses a magnetic pole and all of these magnetic poles have the same polarity, each of the U-like shaped sections is formed by a plurality of non-continuous cut-out grooves that pass through a width of the uncluttered rotor, each non-continuous cut-out groove separated from other non-continuous cut-out grooves around the same magnetic pole; and
   an excitation core spaced apart from the stator and the uncluttered rotor that magnetically couples the uncluttered rotor;
   where an excitation coil generates a magnet torque by inducing magnetic poles that interact with the stator currents near an outer peripheral surface of the uncluttered rotor; and
   where the stator generates a reluctance torque by a reaction of a flux generated by the stator currents which goes through the different direct and quadrature flux paths of the uncluttered rotor.

2. The permanent magnet-less, brushless synchronous system of claim 1 where the excitation core comprises a plurality of ring-like elements.

3. The permanent magnet-less, brushless synchronous system of claim 1 where the uncluttered rotor comprises a plurality of mechanical supporting elements that provides mechanical support to each of a plurality of laminations that comprise the uncluttered rotor.

4. The permanent magnet-less, brushless synchronous system of claim 3 where the excitation core provides a flux carrying path that further renders the magnet torque.

5. The permanent magnet-less, brushless synchronous system of claim 1 where the excitation coil is configured to produce excitation fields of adjustable field strength.

6. The permanent magnet-less, brushless synchronous system of claim 1 further comprising an excitation controller that adjusts the excitation fields sourced by the excitation coil in response to an output of a vehicle speed and output sensors.

7. The permanent magnet-less, brushless synchronous system of claim 1 further comprising an energy detector electrically coupled to the stator and the excitation coil to monitor a current or a voltage and a processor coupled to an input/output device that shutoffs the excitation field when a failure condition is detected.

8. The permanent magnet-less, brushless synchronous system of claim 7 where a failure condition comprises the detection of an excessive current or an excessive voltage drawn by the synchronous system.

9. The permanent magnet-less, brushless synchronous system of claim 1 further comprising mechanical reinforcement elements that pass between a proximal end and a distal end of one or more non-continuous cut-out grooves to render a unitary rotor.

10. The permanent magnet-less, brushless synchronous system of claim 9 where the mechanical reinforcement elements comprise a plurality of joining elements each having a thick distal end and a tapered proximal end.

11. The permanent magnet-less, brushless synchronous system of claim 9 further comprising
a plurality of narrow bridges that conductively couple adjacent poles induced on the uncluttered rotor near the outer periphery of the uncluttered rotor;
where the plurality of mechanical reinforcement elements are configured to maintain the integrity of the uncluttered rotor to a rotation rate of more than ten thousand revolutions per minute; and
where the adjacent poles are of opposite polarity.

12. The permanent magnet-less, brushless synchronous system of claim 1 further comprising
a plurality of narrow bridges that conductively couple adjacent poles induced on the uncluttered rotor near the outer periphery of the uncluttered rotor, where the adjacent poles are of opposite polarity.

13. The permanent magnet-less, brushless synchronous system of claim 12 where the plurality of narrow bridges each comprise a radial thickness of about one millimeter or less.

14. The permanent magnet-less, brushless synchronous system of claim 13 where the narrow bridges are positioned adjacent to a raised area of an end-piece that is in contact with open areas of the U-like sections.

15. A permanent magnet-less, brushless synchronous system comprising:
a stator that generates a magnetic rotating field when sourced by an alternating current;
an uncluttered rotor disposed within the magnetic rotating field and spaced apart from the stator to form an air gap relative to an axis of rotation;
an excitation core spaced apart from the stator and the uncluttered rotor and magnetically coupled to the uncluttered rotor; and
an end-piece mechanically coupling the outer perimeter of the uncluttered rotor comprising a plurality of raised portions joined to a substantially uniformly dimensioned annulus portion;
where the uncluttered rotor comprises a plurality of U-like shaped sections distributed about an outer periphery of the uncluttered rotor wherein each and every one of the plurality of U-like shaped sections on the uncluttered rotor partially encloses a magnetic pole and all of these magnetic poles have the same polarity, each of the U-like shaped sections is formed by a plurality of non-continuous cut-out grooves that pass through a width of the uncluttered rotor, each non-continuous cut-out groove separated from other non-continuous cut-out grooves around the same magnetic pole;
where an excitation source generates a magnet torque by inducing magnetic poles that interact with the stator currents near an outer peripheral surface of the uncluttered rotor;
where the stator generates a reluctance torque by a reaction of the flux generated by the stator currents which goes through the different direct and quadrature flux paths of the uncluttered rotor.

16. The permanent magnet-less, brushless synchronous system of claim 15 where the raised portions of said end-piece are substantially aligned with each open area of the U-like shaped sections bounded by the cut-out-grooves.

17. The permanent magnet-less, brushless synchronous system of claim 15 where the end-piece has a greater axial width inside each open area of the U-like shaped sections than the width outside of each open area of the U-like shaped sections.

18. A permanent magnet-less, brushless synchronous system comprising:
a stator that generates a magnetic rotating field when sourced by an alternating current;
an uncluttered rotor disposed within the magnetic rotating field and spaced apart from the stator to form an air gap relative to an axis of rotation, the uncluttered rotor comprising a plurality of U-like shaped sections, each formed by a plurality of non-continuous cut-out grooves that pass through a width of the uncluttered rotor, each non-continuous cut-out groove separated from other non-continuous cut-out grooves around the same magnetic pole, wherein each and every one of the plurality of U-like shaped sections on the uncluttered rotor partial encloses a magnetic pole and all of these magnetic poles have the same polarity;
an excitation core spaced apart from the stator and the uncluttered rotor and magnetically coupled to the uncluttered rotor;
an end-piece mechanically coupling the outer perimeter of the uncluttered rotor comprising a plurality of raised portions joined to a substantially uniformly dimensioned annulus portion; and
a plurality of mechanical reinforcement elements that pass between a proximal end and a distal end of one or more non-continuous cut-out grooves to render a unitary rotor;
where an excitation coil generates a magnet torque by inducing magnetic poles that interact with the stator currents near an outer peripheral surface of the uncluttered rotor;
where the stator generates a reluctance torque by a reaction of the flux generated by the stator currents which goes through the different direct and quadrature flux paths of the uncluttered rotor.

19. The permanent magnet-less, brushless synchronous system of claim 18 where the stator comprises a wound stator.

20. The permanent magnet-less, brushless synchronous system of claim 18 where the synchronous system comprises a generator that receives mechanical energy and outputs electrical energy.

* * * * *

UNITED STATES PATENT AND TRADEMARK OFFICE
CERTIFICATE OF CORRECTION

PATENT NO. : 8,330,319 B2  
APPLICATION NO. : 12/466169  
DATED : December 11, 2012  
INVENTOR(S) : John S. Hsu Page 1 of 1

It is certified that error appears in the above-identified patent and that said Letters Patent is hereby corrected as shown below:

<u>Title page, item [73] ASSIGNEE</u>: should read as follows:

UT-Battelle, LLC

<u>RESIDENCE: (CITY and STATE OR COUNTRY)</u>: should read as follows:

Oak Ridge, Tennessee

Signed and Sealed this  
Fifteenth Day of January, 2013

David J. Kappos  
*Director of the United States Patent and Trademark Office*